(12) United States Patent
Venkataramani et al.

(10) Patent No.: US 9,571,497 B1
(45) Date of Patent: Feb. 14, 2017

(54) SYSTEMS AND METHODS FOR BLOCKING PUSH AUTHENTICATION SPAM

(71) Applicant: Symantec Corporation, Mountain View, CA (US)

(72) Inventors: Srinath Venkataramani, Bangalore (IN); Rosarin Jolly Antonyraj, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 151 days.

(21) Appl. No.: 14/513,897

(22) Filed: Oct. 14, 2014

(51) Int. Cl.
*H04L 29/06* (2006.01)

(52) U.S. Cl.
CPC ............... *H04L 63/10* (2013.01); *H04L 63/08* (2013.01)

(58) Field of Classification Search
CPC .................................. H04L 63/10; H04L 63/08
USPC ...................................... 726/4, 2, 21, 26, 27
See application file for complete search history.

(56) References Cited

U.S. PATENT DOCUMENTS

| | | | |
|---|---|---|---|
| 8,370,389 B1 | 2/2013 | Dotan | |
| 8,959,588 B1 * | 2/2015 | Vijayan | H04L 9/32 726/3 |
| 9,177,293 B1 * | 11/2015 | Gagnon | G06Q 10/107 |
| 9,402,181 B1 * | 7/2016 | Yi | H04W 12/06 |
| 2004/0030753 A1 | 2/2004 | Horvitz | |
| 2006/0120607 A1 | 6/2006 | Lev | |
| 2006/0287963 A1 | 12/2006 | Steeves et al. | |
| 2008/0184267 A1 | 7/2008 | Hochmuth | |
| 2008/0282331 A1 * | 11/2008 | Teo | H04L 63/08 726/6 |
| 2011/0145899 A1 * | 6/2011 | Cao | H04L 9/3213 726/7 |
| 2011/0173681 A1 * | 7/2011 | Qureshi | H04L 63/0823 726/4 |
| 2011/0247045 A1 | 10/2011 | Rajagopal et al. | |
| 2012/0233656 A1 * | 9/2012 | Rieschick | H04L 63/1441 726/1 |

(Continued)

OTHER PUBLICATIONS

Zorn, G. et al., "RADIUS Attributes for Tunnel Protocol Support", http://www.ietf.org/rfc/rfc2868.txt, as accessed on Aug. 19, 2014, Network Working Group, Request for Comments: 2868, The Internet Society, (Jun. 2000).

(Continued)

*Primary Examiner* — Sarah Su
(74) *Attorney, Agent, or Firm* — Fisherbroyles LLP

(57) ABSTRACT

The disclosed computer-implemented method for blocking push authentication spam may include (1) detecting an attempt by an unauthenticated source to gain access to a web resource protected by an MFA service, (2) issuing, to a mobile device of an authenticated user of the MFA service, a push authentication request to query the authenticated user about whether to allow the unauthenticated source's attempt, (3) determining, based at least in part on the push authentication request issued to the mobile device, that the authenticated user has not allowed the unauthenticated source's attempt, and (4) in response to determining that the authenticated user has not allowed the unauthenticated source's attempt, blacklisting the unauthenticated source such that the MFA service refuses to issue any subsequent push authentication requests in connection with the unauthenticated source. Various other methods, systems, and computer-readable media are also disclosed.

20 Claims, 7 Drawing Sheets

(56) References Cited

U.S. PATENT DOCUMENTS

| | | | |
|---|---|---|---|
| 2012/0295648 A1 | 11/2012 | Naaman | |
| 2013/0122864 A1 | 5/2013 | Haggerty et al. | |
| 2014/0245396 A1* | 8/2014 | Oberheide | H04L 63/08 |
| | | | 726/4 |
| 2014/0259138 A1* | 9/2014 | Fu | H04L 63/083 |
| | | | 726/7 |
| 2015/0294313 A1* | 10/2015 | Kamal | G06Q 20/322 |
| | | | 705/44 |

OTHER PUBLICATIONS

"RADIUS", http://en.wikipedia.org/wiki/RADIUS, as accessed on Aug. 19, 2014, Wikipedia, (Dec. 9, 2003).

Chakrabarty, Amit "Symantec VIP Mobile Push Demo", http://www.symantec.com/connect/blogs/symantec-vip-mobile-push-demo, as accessed on Jun. 18, 2014, (Sep. 18, 2013).

Scott Schneider, et al; Systems and Methods for Enabling Biometric Authentication Options; U.S. Appl. No. 14/178,276, filed Feb. 12, 2014.

Liyu Yi, et al; Systems and Methods for Completing Multi-Factor Authentication via Mobile Devices; U.S. Appl. No. 14/448,517, filed Jul. 31, 2014.

* cited by examiner

SYSTEMS AND METHODS FOR BLOCKING PUSH AUTHENTICATION SPAM

BACKGROUND

Security is often described as a continuum between convenience and safety. A system that requires ten layers of authentication may be very difficult to attack, but it may also be so inconvenient that it will never be used. At the opposite end, a system with no means of authentication or authorization is highly convenient for users but also highly insecure. Many systems now offer an option for Multi-Factor Authentication (MFA), which uses at least one additional piece of information beyond or in place of the traditional username and password combination. Some MFA systems may involve additional devices such as mobile phones and tablets. These MFA systems may ask the user to enter a code sent to a mobile device or to take an action on the mobile device that is then transmitted back to an authentication server to complete the login process.

One downside of MFA systems that involve mobile devices is that repeated illegitimate login attempts by malicious third parties may cause a flood of push authentication requests to the mobile device, annoying users. Some traditional systems may allow a user to block requests from being pushed to their mobile device. However, these traditional systems may be all or nothing filters that cannot allow legitimate push authentication requests through while blocking spam requests. Accordingly, the instant disclosure identifies and addresses a need for additional and improved systems and methods for blocking push authentication spam.

SUMMARY

As will be described in greater detail below, the instant disclosure describes various systems and methods for blocking push authentication spam by blacklisting spam sources based on user responses to push authentication requests from the spam sources.

In one example, a computer-implemented method for blocking push authentication spam may include (1) detecting an attempt by an unauthenticated source to gain access to a web resource protected by an MFA service, (2) issuing, to a mobile device of an authenticated user of the MFA service, a push authentication request to query the authenticated user about whether to allow the unauthenticated source's attempt to gain access to the web resource, (3) determining, based at least in part on the push authentication request issued to the mobile device, that the authenticated user has not allowed the unauthenticated source's attempt to gain access to the web resource, and (4) in response to determining that the authenticated user has not allowed the unauthenticated source's attempt to access the web resource, blacklisting the unauthenticated source such that the MFA service refuses to issue any subsequent push authentication requests in connection with the unauthenticated source.

In some embodiments, the unauthenticated source may include an Internet Protocol (IP) address. In one embodiment, the web resource may include a protected uniform resource locator (URL) and detecting the unauthenticated source's attempt to gain access to the web resource may include capturing, by a script running on the protected URL, an IP address of the unauthenticated source. In this embodiment, blacklisting the unauthenticated source may include blacklisting the IP address of the unauthenticated source such that the MFA service refuses to issue any subsequent push authentication requests in connection with the blacklisted IP address.

Additionally or alternatively, the web resource may include a gateway service and detecting the unauthenticated source's attempt to gain access to the web resource may include capturing, by the gateway service, an IP address of the unauthenticated source. In this embodiment, blacklisting the unauthenticated source may include blacklisting the IP address of the unauthenticated source such that the MFA service refuses to issue any subsequent push authentication requests in connection with the blacklisted IP address.

In one embodiment, determining that the authenticated user has not allowed the unauthenticated source's attempt to gain access to the web resource may include determining that the authenticated user has not allowed a number of attempts by the unauthenticated source to access the web resource and determining that the number of attempts by the unauthenticated source exceeds a certain threshold. In some examples, blacklisting the unauthenticated source may include blacklisting the unauthenticated source due at least in part to the number of attempts by the unauthenticated source exceeding the certain threshold.

Additionally or alternatively, determining that the authenticated user has not allowed the unauthenticated source's attempt to gain access to the web resource may include determining that the authenticated user has not allowed at least one other attempt by at least one other source to gain access to the web resource and determining that the unauthenticated source and the other source exceed a threshold level of similarity relative to one another. In some examples, blacklisting the unauthenticated source may include blacklisting the unauthenticated source due at least in part to the authenticated user not having allowed the other source's attempt to gain access to the web resource and the unauthenticated source and the other source exceeding the threshold level of similarity.

In some examples, determining that the authenticated user has not allowed the unauthenticated source's attempt to access the web resource may include determining that the authenticated user has rejected the push authentication request. In other examples, determining that the authenticated user has not allowed the unauthenticated source's attempt to access the web resource may include determining that the authenticated user has not responded to the push authentication request within a certain time period.

In one embodiment, the computer-implemented method may further include detecting a subsequent attempt by the unauthenticated source to gain access to the web resource protected by the MFA service and refusing to issue a subsequent push authentication request to the mobile device in response to the subsequent unauthenticated source's attempt due at least in part to the unauthenticated source being blacklisted. Additionally or alternatively, the computer-implemented method may further include detecting a subsequent attempt by the unauthenticated source to gain access to the web resource protected by the MFA service and blocking a subsequent push authentication request from reaching the mobile device due at least in part to the unauthenticated source being blacklisted. In some examples, blacklisting the unauthenticated source may include classifying the unauthenticated source as a source of push authentication spam.

In one embodiment, the unauthenticated source may include an instance of an application used in the attempt to gain access to the web resource and detecting the unauthenticated source's attempt to gain access to the web resource may include generating, by a script provided to the unauthenticated source, a unique identifier that identifies the instance of the application used in the attempt to gain access to the web resource. In this embodiment, blacklisting the unauthenticated source may include blacklisting the instance of the application used in the attempt to gain access to the web resource such that the MFA service refuses to issue any subsequent push authentication requests in connection with the blacklisted instance of the application.

In one embodiment, a system for implementing the above-described method may include (1) a detection module, stored in memory, that detects an attempt by an unauthenticated source to gain access to a web resource protected by an MFA service, (2) an issuing module, stored in memory, that issues, to a mobile device of an authenticated user of the MFA service, a push authentication request to query the authenticated user about whether to allow the unauthenticated source's attempt to gain access to the web resource, (3) a determination module, stored in memory, that determines, based at least in part on the push authentication request issued to the mobile device, that the authenticated user has not allowed the unauthenticated source's attempt to gain access to the web resource, (4) a blacklisting module, stored in memory, that, in response to determining that the authenticated user has not allowed the unauthenticated source's attempt to access the web resource, blacklists the unauthenticated source such that the MFA service refuses to issue any subsequent push authentication requests in connection with the unauthenticated source, and (5) at least one physical processor configured to execute the detection module, the issuing module, the determination module, and the blacklisting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect an attempt by an unauthenticated source to gain access to a web resource protected by an MFA service, (2) issue, to a mobile device of an authenticated user of the MFA service, a push authentication request to query the authenticated user about whether to allow the unauthenticated source's attempt to gain access to the web resource, (3) determine, based at least in part on the push authentication request issued to the mobile device, that the authenticated user has not allowed the unauthenticated source's attempt to gain access to the web resource, and (4) blacklist, in response to determining that the authenticated user has not allowed the unauthenticated source's attempt to access the web resource, blacklisting the unauthenticated source such that the MFA service refuses to issue any subsequent push authentication requests in connection with the unauthenticated source.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
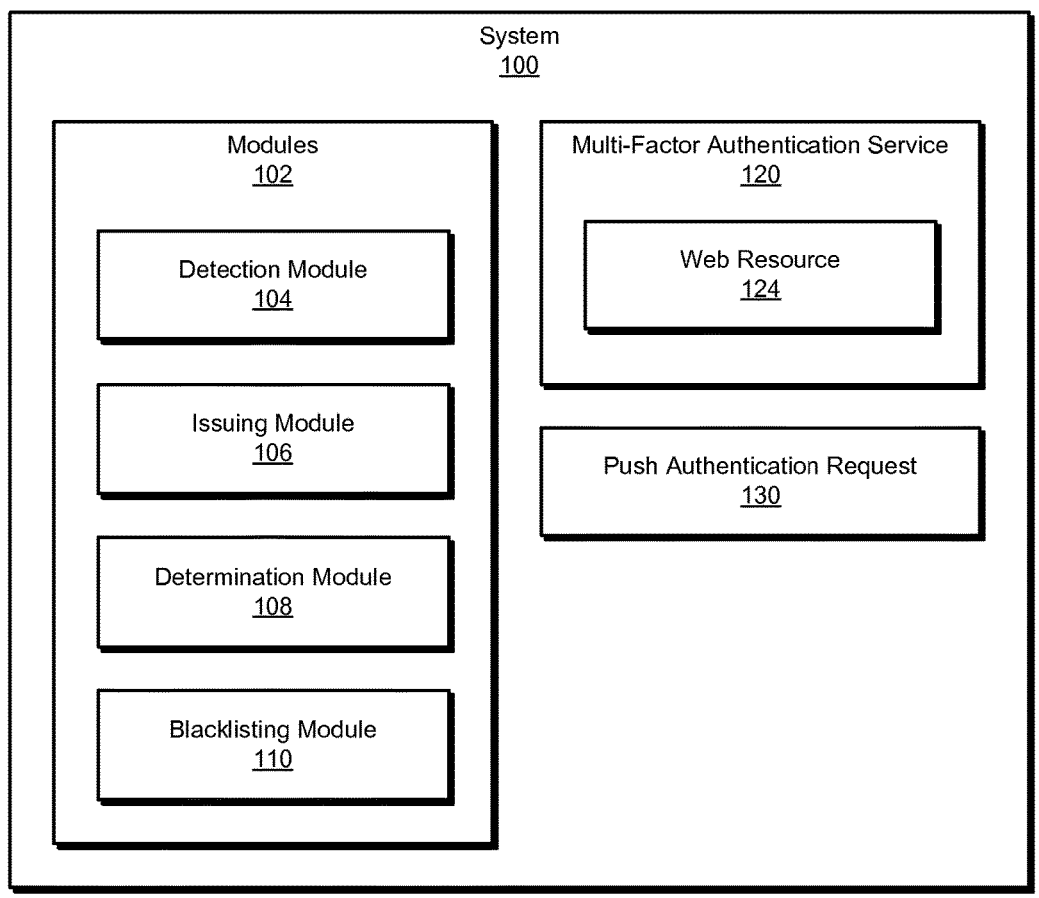
FIG. 1 is a block diagram of an exemplary system for blocking push authentication spam.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for blocking push authentication spam. As will be explained in greater detail below, by blacklisting sources of push authentication spam based at least in part on user responses, the systems and methods described herein may be able to block push authentication spam without blocking legitimate push authentications. In addition, by blocking push authentication sources that are suspiciously similar to previously blacklisted sources, the systems described herein may be able to more quickly and accurately identify and/or blacklist sources of push authentication spam.

Figure 2:
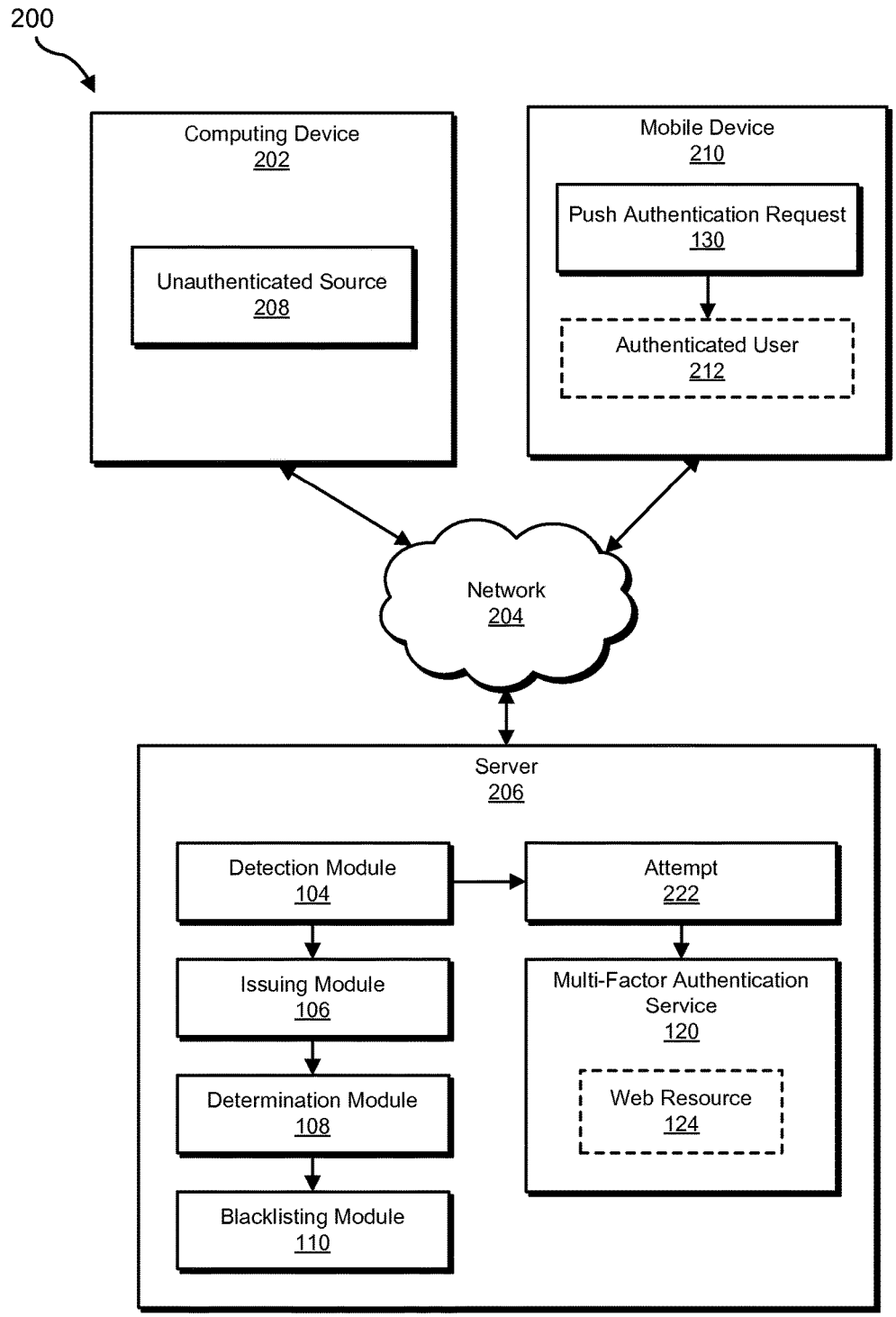
FIG. 2 is a block diagram of an additional exemplary system for blocking push authentication spam.

The following will provide, with reference to FIGS. 1-2 detailed descriptions of exemplary systems for blocking push authentication spam. Detailed descriptions of corresponding computer-implemented methods will also be provided in connection with FIGS. 3 and 5. Detailed descriptions of a push authentication on a mobile device will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for blocking push authentication spam. As illustrated in this figure, exemplary system 100 may include one or more modules 102 for performing one or more tasks. For example, and as will be explained in greater detail below, exemplary system 100 may include a detection module 104 that detects an attempt by an unauthenticated source to gain access to a web resource protected by an MFA service. Exemplary system 100 may additionally include an issuing module 106 that issues, to a mobile device of an authenticated user of the MFA service, a push authentication request to query the authenticated user about whether to allow the unauthenticated source's attempt to gain access to the web resource.

Exemplary system 100 may also include a determination module 108 that determines, based at least in part on the push authentication request issued to the mobile device, that the authenticated user has not allowed the unauthenticated source's attempt to gain access to the web resource. Exemplary system 100 may additionally include a blacklisting module 110 that blacklists, in response to the determination that the authenticated user has not allowed the unauthenticated source's attempt to access the web resource, the unauthenticated source such that the MFA service refuses to issue any subsequent push authentication requests in connection with the unauthenticated source. Although illustrated as separate elements, one or more of modules 102 in FIG. 1 may represent portions of a single module, application, and/or service (such as MFA service 120).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, server 206, and/or mobile device 210), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more authentication services, such as MFA service 120. The term "multi-factor authentication" and the abbreviation "MFA," as used herein, generally refer to any type or form of service that authenticates access to one or more resources based at least in part on certain authentication factors other than or in addition to a username and password. Such authentication factors include, without limitation, a code sent to a mobile device, a user action on a mobile device, an action on and/or with respect to an additional web resource, a biometric authentication factor, combinations of one or more of the same, or any other suitable authentication factors.

In one example, MFA service 120 may handle authentication for access to a web resource 124. The term "web resource," as used herein, generally refers to any type or form of computing resource and/or object that is accessible via a network (such as the Internet). In one example, web resource 124 may include information stored in connection with a web site and/or a web service. For example, web resource 124 may include one or more files stored in connection with a user's login credentials for a web site and/or web service. Examples of web resource 124 include, without limitation, Internet resources web pages, web sites, scripts, servers, application programming interfaces, databases, remote devices, files, web services, URLs, portions of one or more of the same, variations of one or more of the same, combinations of one or more of the same, or any other suitable web resource.

As illustrated in FIG. 1, exemplary system 100 may additionally include one or more push authentication requests, such as push authentication request 130. The term "push authentication request," as used herein, may refer to any type or form of communication and/or message sent to a user's device as part of an MFA process. In one example, push authentication request 130 may include an authentication push notification sent to a user's mobile device as part of a login attempt. In this example, push authentication request 130 may prompt the user to take an action in connection with an attempt to access and/or log into web resource 124. For example, push authentication request 130 may ask the user to allow or deny an attempt to access and/or log into web resource 124 via MFA service 120.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a mobile device 210 and/or a server 206 via a network 204. In one example, server 206 may be programmed with one or more of modules 102. Additionally or alternatively, mobile device 210 may be programmed with one or more of modules 102.

In one example, computing device 202 may enable an unauthenticated source 208 to initiate an attempt 222 to gain access to web resource 124 via MFA service 120. In this example, MFA service 120 may issue push authentication request 130 to query an authenticated user 212 of MFA service 120 about whether to allow or deny attempt 222 to gain access to web resource 124.

In one embodiment, one or more of modules 102 from FIG. 1 may, when executed by at least one processor of server 206, enable server 206 to block push authentication spam. For example, and as will be described in greater detail below, detection module 104 may detect an attempt 222 by an unauthenticated source 208 to gain access to web resource 124 protected by MFA service 120. Next, issuing module 106 may issue, to a mobile device 210 of an authenticated user 212 of MFA service 120, push authentication request 130 to query authenticated user 212 about whether to allow attempt 222 by unauthenticated source 208 to gain access to web resource 124. Determination module 108 may determine, based at least in part on push authentication request 130 issued to mobile device 210, that authenticated user 212 has not allowed attempt 222 by unauthenticated source 208 to gain access to web resource 124. Finally, blacklisting module 110 may, in response to the determination that authenticated user 212 has not allowed attempt 222 by unauthenticated source 208 to gain access web resource 124, blacklist unauthenticated source 208 such that MFA service 120 refuses to issue any subsequent push authentication requests in connection with unauthenticated source 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device capable of facilitating and/or providing at least a portion of an MFA service. Examples of security server 206 include, without limitation, security servers, application servers, web servers, storage servers, and/or database servers configured to run certain software applications and/or provide various security, web, storage, and/or database services. In one example, server 206 may belong to an authentication service provider responsible for protecting against unauthorized access to web resource 124. Although illustrated as a single device, server 206 may represent a plurality of servers working in conjunction with one another to protect against unauthorized access to web resource 124.

Mobile device 210 generally represents any type or form of portable computing device capable of reading computer-executable instructions. Examples of computing device 202 include, without limitation, laptops, tablets, cellular phones, PDAs, multimedia players, wearable devices, combinations of one or more of the same, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, a Power Line Communications (PLC) network, a cellular network (e.g., a Global System for Mobile Communications (GSM) network), exemplary network architecture 700 in FIG. 7, or the like. Network 204 may facilitate communication or data transfer using wireless and/or wired connections. In one embodiment, network 204 may facilitate communication among computing device 202, mobile device 210, and/or server 206.

Unauthenticated source 208 generally represents to any entity that may initiate an authentication attempt and/or any identifier of an entity that may initiate of an authentication attempt. The term "unauthenticated," as used herein, generally refers to any type or form of state and/or condition of being disallowed legitimate access to a protected resource. In one example, unauthenticated source 208 may include and/or represent an identifier of computing device 202 used to initiate attempt 222 to gain access to web resource 124. Additionally or alternatively, unauthenticated source 208 may include and/or represent an identifier of an application used to initiate attempt 222 to gain access to web resource 124. Examples of unauthenticated source 208 include, without limitation, an IP address, an application fingerprint, combinations of one or more of the same, a computing device, a user, a bot, a botnet, and/or any other unauthenticated source.

The term "attempt," as used herein, generally refers to any type or form of action directed to gaining access to a web resource. In one example, attempt 222 may include and/or represent an attempt to log into MFA service 120. Additionally or alternatively, attempt 222 may include and/or represent an attempt to intercept and/or download web resource 124.

The term "authenticated user," as used herein, generally refers to any user with legitimate access to a protected resource. In some examples, authenticated user 212 may be a user in possession of mobile device 210 that is configured with an MFA application for accessing web resource 124. Additionally or alternatively, authenticated user 212 may be a user whose credentials are being used in attempt 222 to access web resource 124.

Figure 3:
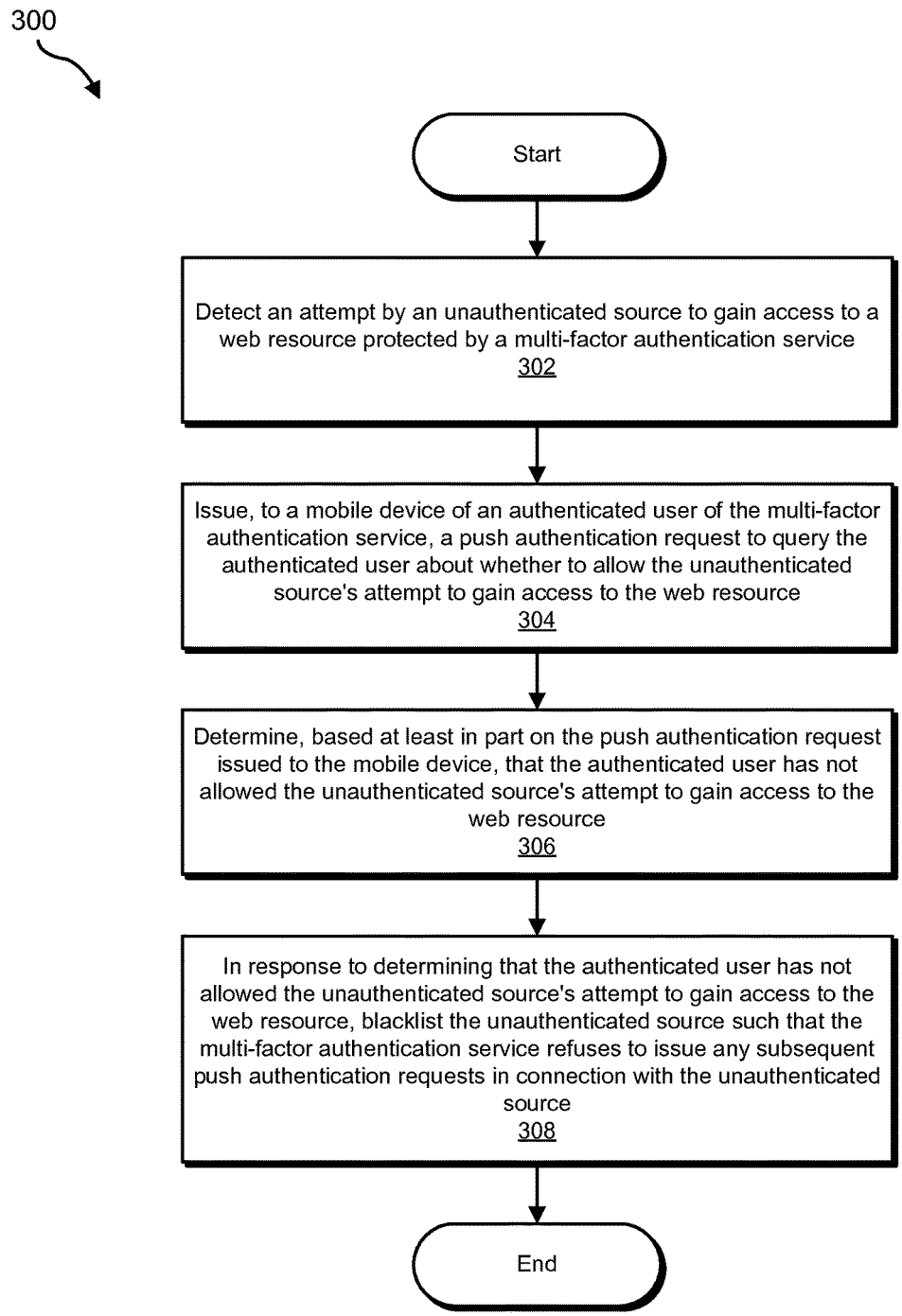
FIG. 3 is a flow diagram of an exemplary method for blocking push authentication spam.

FIG. 3 is a flow diagram of an exemplary computer-implemented method 300 for blocking push authentication spam. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may detect an attempt by an unauthenticated source to gain access to a web resource protected by an MFA service. For example, detection module 104 may, as part of server 206 in FIG. 2, detect attempt 222 by unauthenticated source 208 to gain access to web resource 124 protected by MFA service 120.

Detection module 104 may detect attempt 222 in a variety of ways and/or contexts. For example, detection module 104 may represent part of MFA service 120. As part of MFA service 120, detection module 104 may monitor all attempts to access resources protected by MFA service 120.

In another example, detection module 104 may represent part of web resource 124. As part of web resource 120, detection module 104 may forward login attempts from web resource 124 to MFA service 120.

At step 304, one or more of the systems described herein may issue, to a mobile device of an authenticated user of the MFA service, a push authentication request to query the authenticated user about whether to allow the unauthenticated source's attempt to gain access to the web resource. For example, issuing module 106 may, as part of server 206 in FIG. 2, issue push authentication request 130 to query authenticated user 212 about whether to allow attempt 222 by unauthenticated source 208 to gain access to web resource 124. In this example, push authentication request 130 may be destined and/or intended for mobile device 210 of authenticated user 212.

Issuing module 106 may issue push authentication request 130 in a variety of ways and/or contexts. For example, issuing module 106 may be part of MFA service 120 that may issue a push notification to mobile device 210 as part of an MFA process. In another embodiment, issuing module 106 may be part of an MFA application on mobile device 210 and may display a push notification on mobile device 210 in response to a request from another part of MFA service 120.

Figure 4:
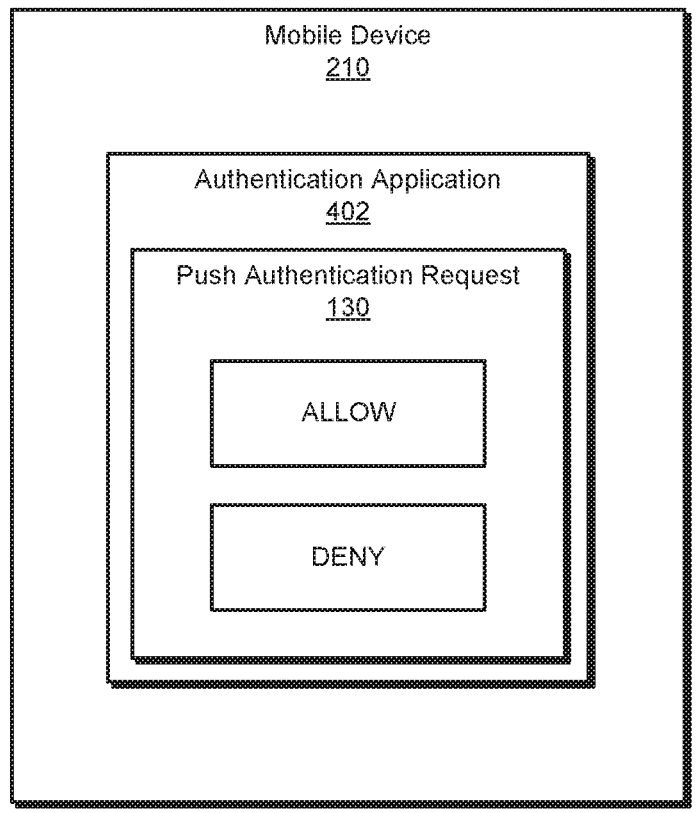
FIG. 4 is a block diagram of an exemplary push authentication request on a mobile device.

In some examples, push authentication request 130 may include user interface elements on a mobile device. As illustrated in FIG. 4, mobile device 210 may include an authentication application 402. In some examples, authentication application 402 may be part of an MFA system that protects a web resource. Authentication application 402 may receive push authentication request 130. In some embodiments, push authentication request 130 may display two buttons in the user interface, "Allow" and "Deny." In other embodiments, the "Allow" button may have other labels such as "Accept," "Authorize," "Okay," and/or "Yes," and/or the "Deny" button may have other labels such as "Reject," "Mark as Spam," "Cancel," and/or "No."

Returning to FIG. 3, at step 306, one or more of the systems described herein may determine, based at least in part on the push authentication request issued to the mobile device, that the authenticated user has not allowed the unauthenticated source's attempt to gain access to the web resource. For example, determination module 108 may, as part of server 206 in FIG. 2, determine, based at least in part on push authentication request 130 issued to mobile device 210, that authenticated user 212 has not allowed attempt 222 by unauthenticated source 208 to gain access to web resource 124.

Determination module 108 may determine that authenticated user 212 has not allowed attempt 222 in a variety of ways and/or contexts. For example, determination module 108 may receive a response from authenticated user 212 indicating that attempt 222 to gain access to web resource 124 is denied. In one example, determination module 108 may determine that authenticated user 212 has not allowed attempt 222 by unauthenticated source 208 to access web resource 124 by determining that authenticated user 212 has rejected push authentication request 130.

In other examples, determination module 108 may determine that authenticated user 212 has not allowed attempt 222 by unauthenticated source 208 to access web resource 124 by determining that authenticated user 212 has not responded to push authentication request 130 within a certain time period. Examples of a certain time period may include, without limitation, one minute, ten minutes, and/or an hour.

In some examples, determination module 108 may determine that authenticated user 212 has not allowed at least one other attempt by at least one other source (not illustrated in FIG. 2) to gain access to web resource 124 and may also determine that unauthenticated source 208 and the other source exceed a threshold level of similarity relative to one another. For example, the other source and unauthenticated source 208 may have the same or similar IP addresses, application fingerprints, time stamps, and/or other characteristics, indicating that the attempts from the sources were likely caused by the same entity. If the user has disallowed the previous attempt from the other source as not being legitimate, then attempt 222 from unauthenticated source 208 may also not be legitimate.

In some embodiments, determination module 108 may determine that authenticated user 212 has not allowed attempt 222 by unauthenticated source 208 to gain access to web resource 124 by determining that authenticated user 212 has not allowed a number of attempts by unauthenticated source 208 to access web resource 124 and the number of attempts by unauthenticated source 208 exceeds a certain threshold. For example, determination module 108 may determine that authenticated user 212 has rejected two previous attempts from unauthenticated source 208 as illegitimate and that therefore the current attempt is likely also illegitimate and should be disallowed. In this example, the systems described herein may not send push authentication request 130 for the attempt 222 to the user.

At step 308, one or more of the systems described herein may, in response to determining that the authenticated user has not allowed the attempt by the unauthenticated source to access the web resource, blacklist the unauthenticated source such that the MFA service refuses to issue any subsequent push authentication requests in connection with the unauthenticated source. For example, blacklisting module 110 may, as part of server 206 in FIG. 2, blacklist, in response to determining that authenticated user 212 has not allowed attempt 222 by unauthenticated source 208 to access web resource 124, blacklist unauthenticated source 208 such that MFA service 120 refuses to issue any subsequent push authentication requests in connection with unauthenticated source 208.

Blacklisting module 110 may blacklist unauthenticated source 208 in a variety of ways and/or contexts. For example, blacklisting module 110 may refuse to issue authentication push notifications in connection with attempts by unauthenticated source 208. In another example, blacklisting module 110 may block any or all stages of login attempts originating from unauthenticated source 208. In some embodiments, blacklisting module 110 may blacklist unauthenticated source 208 by classifying unauthenticated source 208 as a source of push authentication spam.

In some examples, blacklisting module 110 may blacklist unauthenticated source 208 by blacklisting unauthenticated source 208 due at least in part to the number of attempts by unauthenticated source 208 exceeding the certain threshold. For example, an authenticated user may reject three attempts from unauthenticated source 208. In this example, if the certain threshold for blacklisting a source is three, blacklisting module 110 may classify unauthenticated source 208 as spam based at least in part on the three attempts initiated by unauthenticated source 208 being rejected by the user.

Additionally or alternatively, blacklisting module 110 may blacklist unauthenticated source 208 due at least in part to authenticated user 212 not having allowed some other source's attempt to gain access to web resource 124. For example, another source (not illustrated in FIG. 2) may have the same application fingerprint as unauthenticated source 208 and only a slightly different IP address, suggesting that the other source may represent the same entity as unauthenticated source 208. In this example, blacklisting module 110 may blacklist unauthenticated source 208 based at least in part on having already blacklisted another source connected to the same entity.

In some embodiments, web resource 124 may include a protected URL. In these embodiments, detection module 104 may detect attempt 222 by unauthenticated source 208 to gain access to web resource 124 by capturing, via a script running on the protected URL, an IP address of unauthenticated source 208. In addition, blacklisting module 110 may blacklist unauthenticated source 208 by blacklisting the IP address of unauthenticated source 208 such that MFA service 120 refuses to issue any subsequent push authentication requests in connection with the blacklisted IP address. In one example, a script may include JAVASCRIPT embedded in the URL that captures the IP address and/or includes the IP address with any other information sent by scripts and/or forms on the page represented by the URL to a server.

In some embodiments, web resource 124 may include a gateway service. In these embodiments, detection module 104 may detect attempt 222 by unauthenticated source 208 to gain access to web resource 124 by capturing, by the gateway service, an IP address of unauthenticated source 208. In addition, blacklisting module 110 may blacklist unauthenticated source 208 by blacklisting the IP address of unauthenticated source 208 such that MFA service 120 refuses to issue any subsequent push authentication requests in connection with the blacklisted IP address. In one example, push authentication request 130 may be issued by SYMANTEC'S VIP ENTERPRISE RADIUS GATEWAY SERVICE. In this example, the VIP RADIUS SERVICE may capture the tunnel-client-endpoint attribute that provides the authenticating client's IP address and/or may forward the IP address to MFA service 120 and/or other parts of the systems described herein.

In one embodiment, unauthenticated source 208 may include an instance of an application used in attempt 222 to gain access to web resource 124 and detection module 104 may detect attempt 222 by unauthenticated source 208 to gain access to web resource 124 by generating, via a script provided to unauthenticated source 208, a unique identifier that identifies the instance of the application used in attempt 222 to gain access to web resource 124. In this embodiment, blacklisting module 110 may blacklist unauthenticated source 208 by blacklisting the instance of the application used in attempt 222 to gain access to web resource 124 such that MFA service 120 refuses to issue any subsequent push authentication requests in connection with the blacklisted instance of the application. In some examples, the unique identifier may include an application fingerprint.

Figure 5:
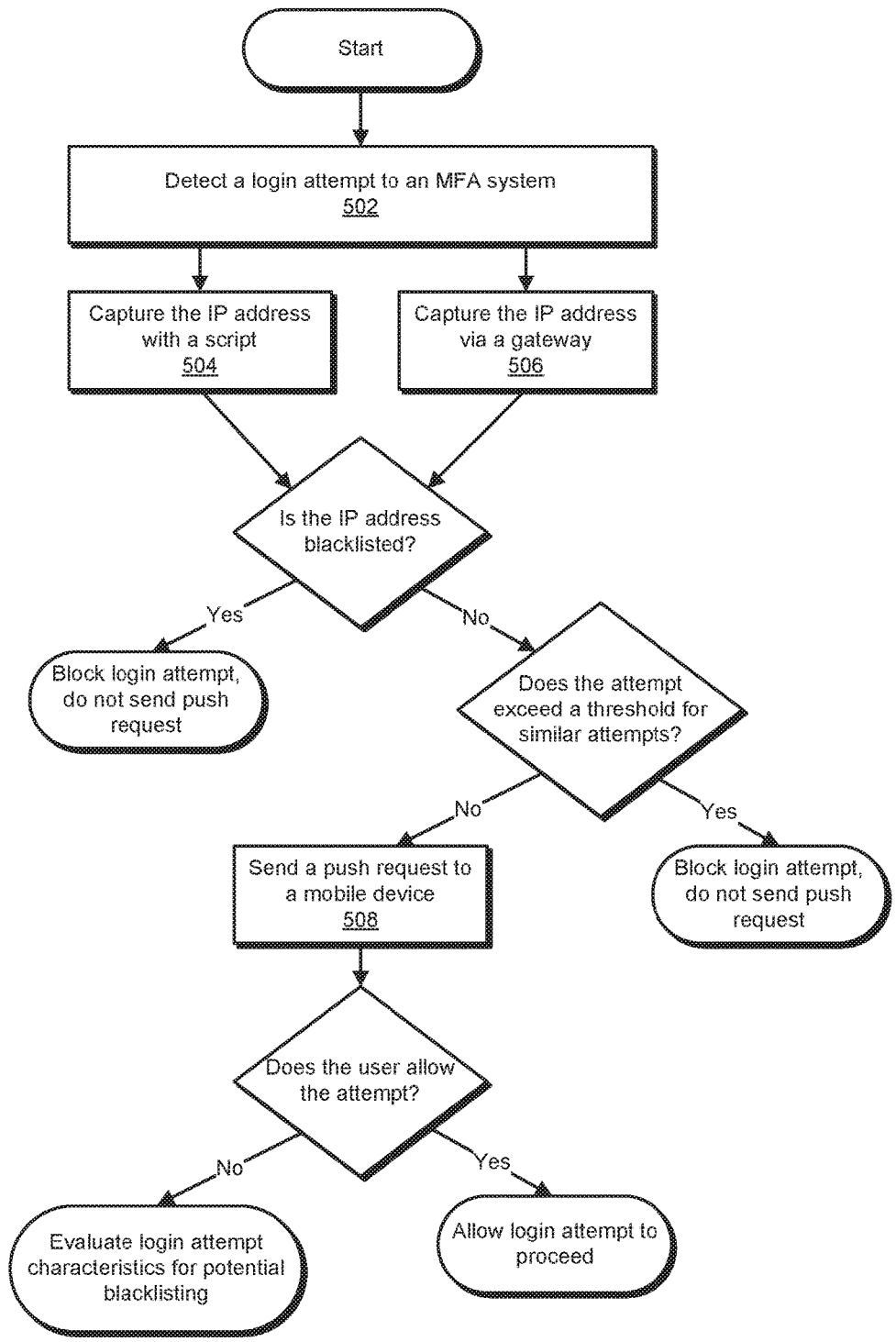
FIG. 5 is a flow diagram of an exemplary method for blocking push authentication spam.

In some embodiments, the systems described herein may go through a variety of decision points while evaluating an attempt to access a protected web resource. As illustrated in FIG. 5, at step 502, the systems described herein may detect a login attempt. Depending on the origin of the login attempt, the systems described herein may capture the IP address with a script as in step 504 and/or via a gateway as in step 506. If the IP address is already blacklisted, the systems described herein may block the login attempt and/or decline to send a push request. If not, the systems described herein may check to see if the attempt exceeds a threshold for similar attempts (i.e., attempts from the same or similar sources). If the attempt does exceed the threshold, the systems described herein may block the login attempt and/or decline to send a push request.

At step 508, the systems described herein may send a push request to a mobile device. If the user of the mobile device allows the attempt, the systems described herein may allow the login attempt to proceed. In some examples, the login process may now be complete; in other examples, additional login steps may be necessary. If the user does not allow the attempt, the systems described herein may evaluate the login attempt characteristics (such as the source of the login attempt) for potential blacklisting using any or all of the methods described above.

In some examples, detection module 104 may detect a subsequent attempt by unauthenticated source 208 to gain access to web resource 124 protected by MFA service 120 and the systems described herein may refuse to issue a subsequent push authentication request to mobile device 210 in response to the subsequent attempt by unauthenticated source 208 due at least in part to unauthenticated source 208 being blacklisted. For example, a login attempt may originate from a blacklisted IP address and the systems described herein may block the login attempt due to the IP address being blacklisted. Additionally or alternatively, the systems described herein may block a subsequent push authentication request from reaching mobile device 210 due at least in part to unauthenticated source 208 being blacklisted.

As explained in connection with method 300 above, the systems described herein may prevent push authentication spam via spam detection and/or spam prevention. The systems described herein may detect spam by recording any IP address that attempts to access protected resources and marking an IP address as a source of spam if a user repeatedly discards or denies push authentication requests initiated by that IP address. Once an IP address is marked as spam, systems described herein may prevent spam by declining to process attempts to access protected resources by that IP address, including blocking login attempts and/or declining to generate and/or issue push authentication requests. The systems described herein may also pre-emptively prevent spam by comparing new sources of attempts to access protected resources to previous sources of attempts and blacklisting and/or blocking access attempts by any source with a weighted Euclidean distance too close to other sources previously categorized as spam. By detecting and preventing push authentication spam in this way, the systems described herein may reduce annoyance to users as well as reducing resource use by servers that would otherwise be tasked with generating and/or issuing spam push authentication requests from illegitimate sources.

Figure 6:
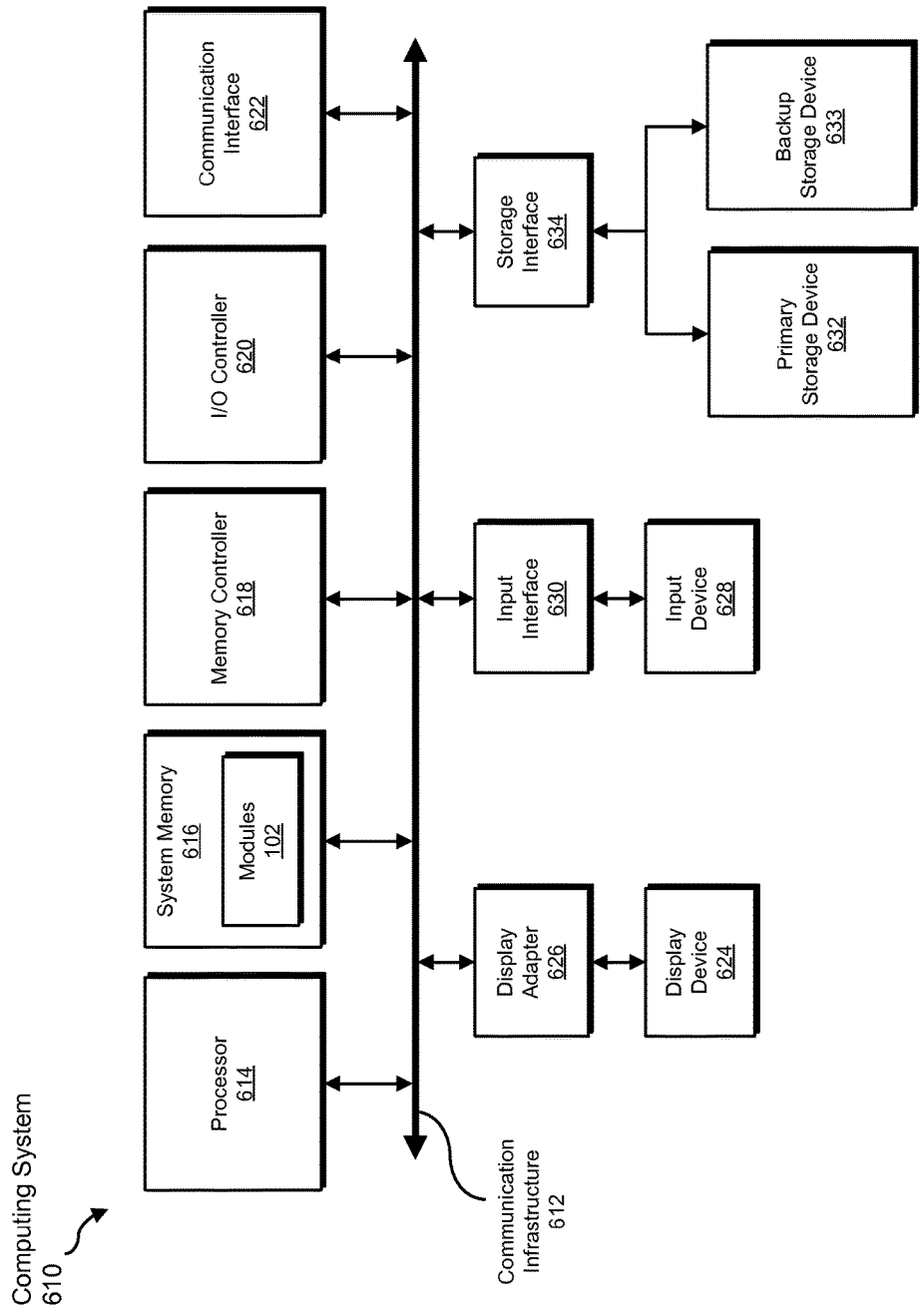
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
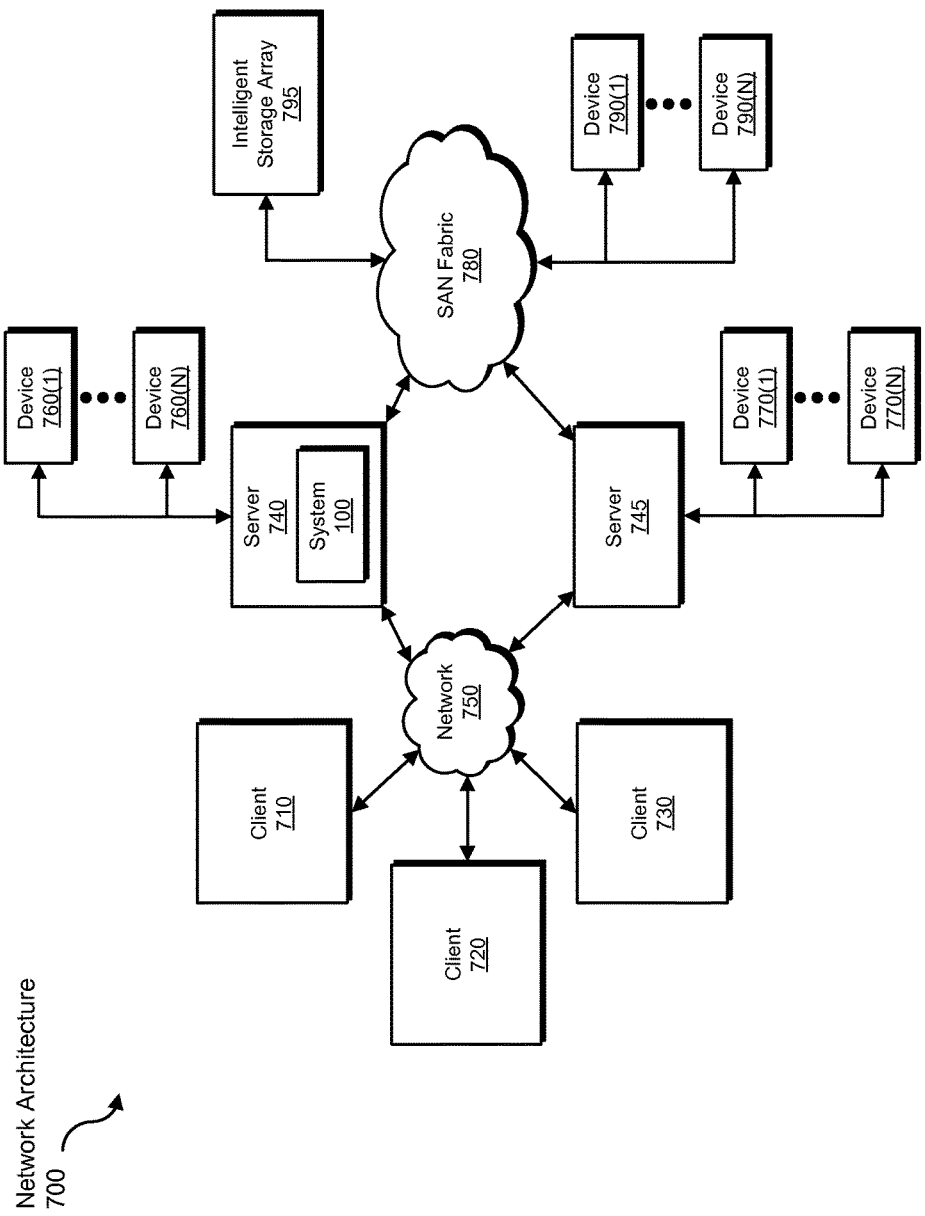
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for blocking push authentication spam.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive push authentication request data to be transformed, transform the push authentication request data, output a result of the transformation to a spam analysis algorithm, use the result of the transformation to determine whether a push authentication notification is spam, and store the result of the transformation to a blacklist of push authentication notification spam sources. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for blocking push authentication spam, at least a portion of the method being performed by a computing device comprising at least one processor, the method comprising:

detecting an attempt by an unauthenticated source to gain access to a web resource protected by a multi-factor authentication service;

issuing, to a mobile device of an authenticated user of the multi-factor authentication service, a push authentication request to query the authenticated user about whether to allow the unauthenticated source's attempt to gain access to the web resource;

determining, based at least in part on the push authentication request issued to the mobile device, that the authenticated user has not allowed the unauthenticated source's attempt to gain access to the web resource; and in response to determining that the authenticated user has not allowed the unauthenticated source's attempt to gain access to the web resource, blacklisting the unauthenticated source such that the multi-factor authentication service refuses to issue any subsequent push authentication requests in connection with the unauthenticated source by classifying the unauthenticated source as a source of push authentication spam that causes repeated push authentication requests triggered by illegitimate login attempts.

2. The computer-implemented method of claim 1, wherein the unauthenticated source comprises an Internet Protocol address.

3. The computer-implemented method of claim 1, wherein:
   determining that the authenticated user has not allowed the unauthenticated source's attempt to gain access to the web resource comprises determining that the authenticated user has not allowed a number of attempts by the unauthenticated source to access the web resource; and
   determining that the number of attempts by the unauthenticated source exceeds a certain threshold.

4. The computer-implemented method of claim 3, wherein blacklisting the unauthenticated source comprises blacklisting the unauthenticated source due at least in part to the number of attempts by the unauthenticated source exceeding the certain threshold.

5. The computer-implemented method of claim 1, wherein determining that the authenticated user has not allowed the unauthenticated source's attempt to gain access to the web resource comprises:
   determining that the authenticated user has not allowed at least one other attempt by at least one other source to gain access to the web resource; and
   determining that the unauthenticated source and the other source exceed a threshold level of similarity relative to one another.

6. The computer-implemented method of claim 5, wherein
   blacklisting the unauthenticated source comprises blacklisting the unauthenticated source due at least in part to:
   the authenticated user not having allowed the other source's attempt to gain access to the web resource; and
   the unauthenticated source and the other source exceeding the threshold level of similarity.

7. The computer-implemented method of claim 1, wherein determining that the authenticated user has not allowed the unauthenticated source's attempt to access the web resource comprises determining that the authenticated user has rejected the push authentication request.

8. The computer-implemented method of claim 1, wherein determining that the authenticated user has not allowed the unauthenticated source's attempt to access the web resource comprises determining that the authenticated user has not responded to the push authentication request within a certain time period.

9. The computer-implemented method of claim 1, further comprising:
   detecting a subsequent attempt by the unauthenticated source to gain access to the web resource protected by the multi-factor authentication service; and
   refusing to issue a subsequent push authentication request to the mobile device in response to the subsequent unauthenticated source's attempt due at least in part to the unauthenticated source being blacklisted.

10. The computer-implemented method of claim 1, further comprising:
   detecting a subsequent attempt by the unauthenticated source to gain access to the web resource protected by the multi-factor authentication service; and
   blocking a subsequent push authentication request from reaching the mobile device due at least in part to the unauthenticated source being blacklisted.

11. The computer-implemented method of claim 1, wherein blacklisting the unauthenticated source comprises classifying the unauthenticated source as a source of push authentication spam.

12. The computer-implemented method of claim 1, wherein:
   the web resource comprises a protected uniform resource locator;
   detecting the unauthenticated source's attempt to gain access to the web resource comprises capturing, by a script running on the protected uniform resource locator, an Internet Protocol address of the unauthenticated source; and
   blacklisting the unauthenticated source comprises blacklisting the Internet Protocol address of the unauthenticated source such that the multi-factor authentication service refuses to issue any subsequent push authentication requests in connection with the blacklisted Internet Protocol address.

13. The computer-implemented method of claim 1, wherein:
   the web resource comprises a gateway service;
   detecting the unauthenticated source's attempt to gain access to the web resource comprises capturing, by the gateway service, an Internet Protocol address of the unauthenticated source; and
   blacklisting the unauthenticated source comprises blacklisting the Internet Protocol address of the unauthenticated source such that the multi-factor authentication service refuses to issue any subsequent push authentication requests in connection with the blacklisted Internet Protocol address.

14. The computer-implemented method of claim 1, wherein:
   the unauthenticated source comprises an instance of an application used in the attempt to gain access to the web resource;
   detecting the unauthenticated source's attempt to gain access to the web resource comprises generating, by a script provided to the unauthenticated source, a unique identifier that identifies the instance of the application used in the attempt to gain access to the web resource; and
   blacklisting the unauthenticated source comprises blacklisting the instance of the application used in the attempt to gain access to the web resource such that the multi-factor authentication service refuses to issue any subsequent push authentication requests in connection with the blacklisted instance of the application.

15. A system for blocking push authentication spam, the system comprising:
   a detection module, stored in memory, that detects an attempt by an unauthenticated source to gain access to a web resource protected by a multi-factor authentication service;
   an issuing module, stored in memory, that issues, to a mobile device of an authenticated user of the multi-factor authentication service, a push authentication request to query the authenticated user about whether to allow the unauthenticated source's attempt to gain access to the web resource;
   a determination module, stored in memory, that determines, based at least in part on the push authentication request issued to the mobile device, that the authenticated user has not allowed the unauthenticated source's attempt to gain access to the web resource;

a blacklisting module, stored in memory, that, in response to determining that the authenticated user has not allowed the unauthenticated source's attempt to gain access to the web resource, blacklists the unauthenticated source such that the multi-factor authentication service refuses to issue any subsequent push authentication requests in connection with the unauthenticated source by classifying the unauthenticated source as a source of push authentication spam that causes repeated push authentication requests triggered by illegitimate login attempts; and at least one physical processor configured to execute the detection module, the issuing module, the determination module, and the blacklisting module.

16. The system of claim 15, wherein the unauthenticated source comprises a botnet.

17. The system of claim 15, wherein the determination module determines that the authenticated user has not allowed the unauthenticated source's attempt to gain access to the web resource by determining that the authenticated user has marked the attempt as illegitimate.

18. The system of claim 15, wherein the blacklisting module blacklists the unauthenticated source by preventing the unauthenticated source from performing additional login attempts.

19. The system of claim 15, wherein the detection module detects a tunnel-client-endpoint attribute of the unauthenticated source.

20. A non-transitory computer-readable medium comprising one or more computer-readable instructions that, when executed by at least one processor of a computing device, cause the computing device to:

detect an attempt by an unauthenticated source to gain access to a web resource protected by a multi-factor authentication service;

issue, to a mobile device of an authenticated user of the multi-factor authentication service, a push authentication request to query the authenticated user about whether to allow the unauthenticated source's attempt to gain access to the web resource;

determine, based at least in part on the push authentication request issued to the mobile device, that the authenticated user has not allowed the unauthenticated source's attempt to gain access to the web resource; and in response to determining that the authenticated user has not allowed the unauthenticated source's attempt to gain access to the web resource, blacklisting the unauthenticated source such that the multi-factor authentication service refuses to issue any subsequent push authentication requests in connection with the unauthenticated source by classifying the unauthenticated source as a source of push authentication spam that causes repeated push authentication requests triggered by illegitimate login attempts.

* * * * *